United States Patent [19]

Oetiker

[11] Patent Number: 5,203,809
[45] Date of Patent: Apr. 20, 1993

[54] SELF-TIGHTENING CLAMP

[76] Inventor: Hans Oetiker, Oberdorfstrasse 21, CH-8812 Horgen, Switzerland

[21] Appl. No.: 803,220

[22] Filed: Dec. 6, 1991

[51] Int. Cl.$^5$ .............................................. B65D 63/00
[52] U.S. Cl. ................................ 24/20 R; 24/20 CW; 24/20 EE
[58] Field of Search ............ 24/20 R, 20 CW, 20 EE, 24/20 S, 20 TT, 27, 23 EE

[56] References Cited

U.S. PATENT DOCUMENTS

| | | | |
|---|---|---|---|
| 3,358,351 | 12/1967 | Ott | 24/23 EE |
| 4,099,298 | 7/1978 | Gimenez | 24/27 |
| 4,305,179 | 12/1981 | Sakurada | 24/20 CW |
| 4,425,681 | 1/1984 | Llius | 24/20 S |
| 4,492,004 | 1/1985 | Oetiker | 24/20 R |
| 4,773,129 | 9/1988 | Muhr | 24/20 R |
| 4,858,279 | 8/1989 | Kato et al. | 24/20 R |
| 4,930,191 | 6/1990 | Takahashi et al. | 24/20 R |
| 4,930,192 | 6/1990 | Muhr | 24/20 R |
| 4,996,749 | 3/1991 | Takahashi | 24/20 CW |

Primary Examiner—Victor N. Sakran
Attorney, Agent, or Firm—Paul M. Craig, Jr.

[57] ABSTRACT

A self-tightening lamp formed from spring steel band material which exerts clamping forces by the inherent springiness of the band material. To minimize outwardly projecting parts with their injury danger and to obtain an inner clamping surface substantially devoid of any gaps or steps, the end of the outer band end portion is provided with an elongated slot adapted to receive the tongue-like overlapped inner band end portion. Temporary locking of the clamp is realized by a detent member in the tongue-like inner band end portion adapted to be lockingly engaged by a locking surface in the outer band portion. The elongated slot is thereby of such width as to accommodate the tongue-like inner band portion whereby the detent member is located in the elongated slot when the clamp is in its clamping position.

49 Claims, 5 Drawing Sheets

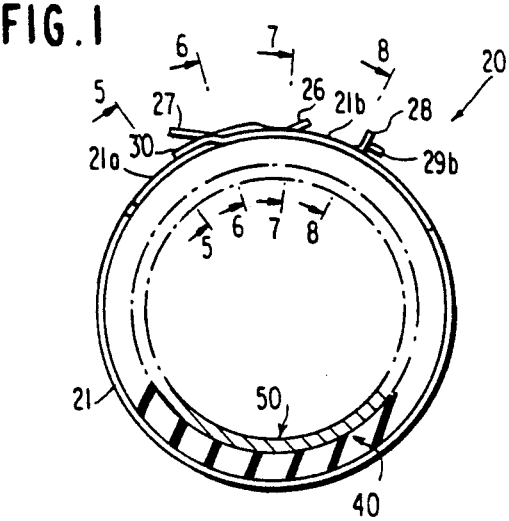
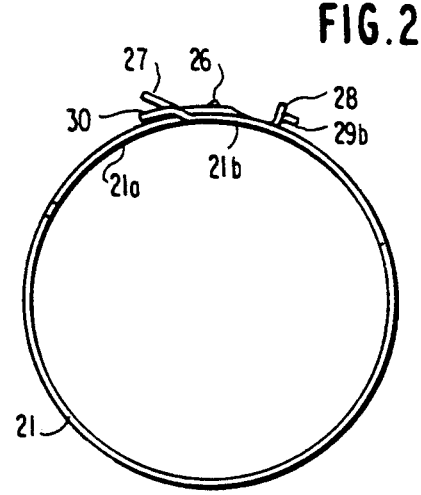
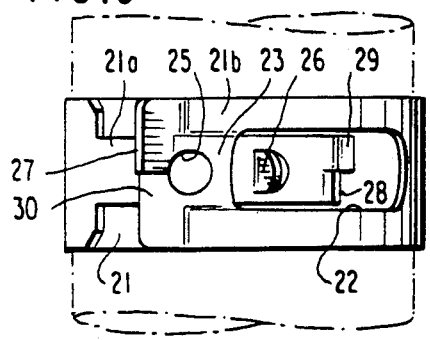
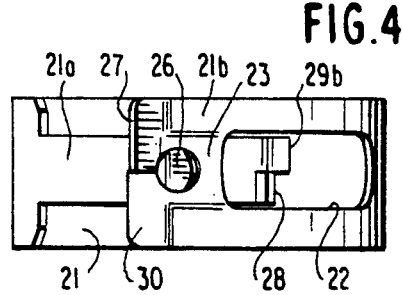
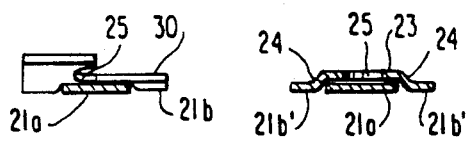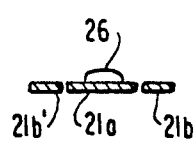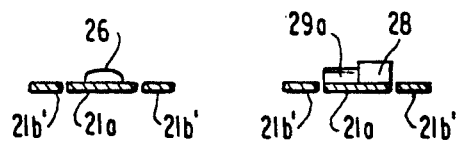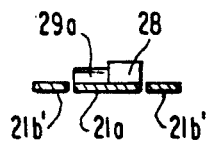
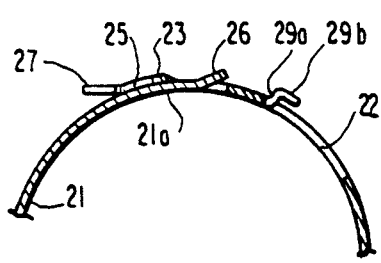
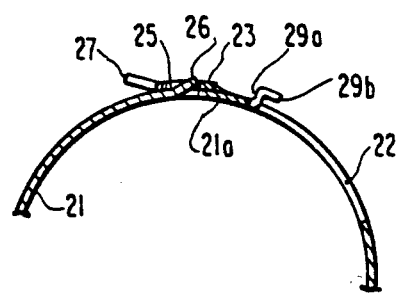

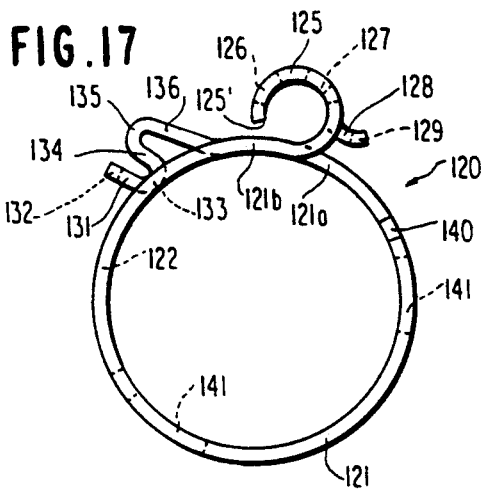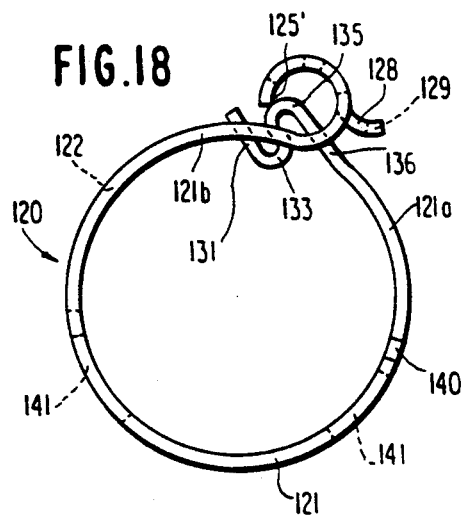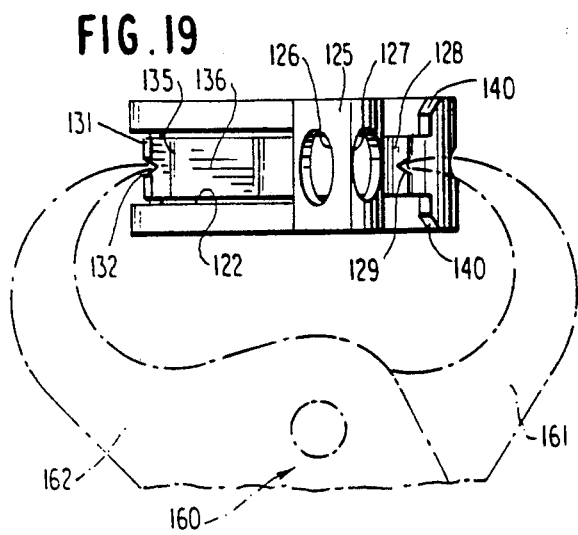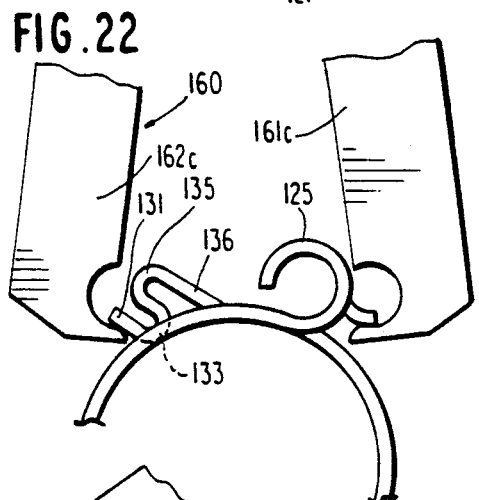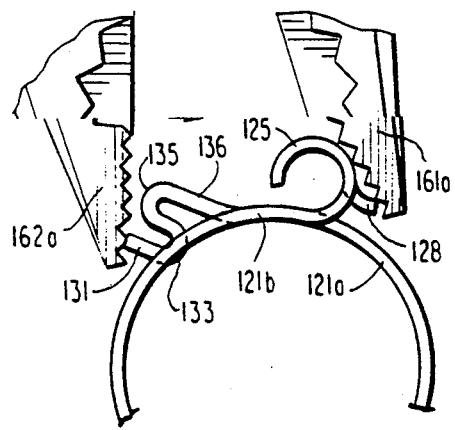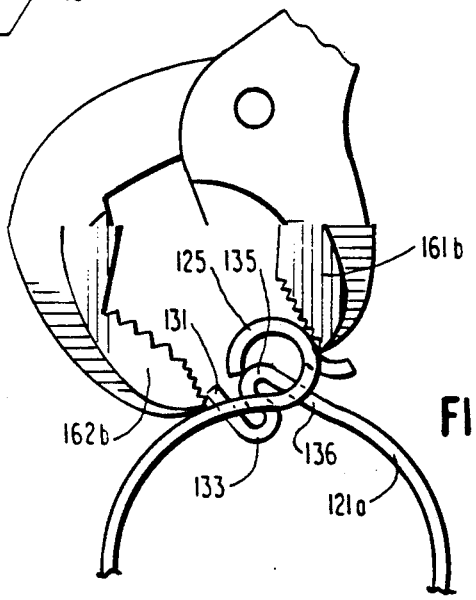

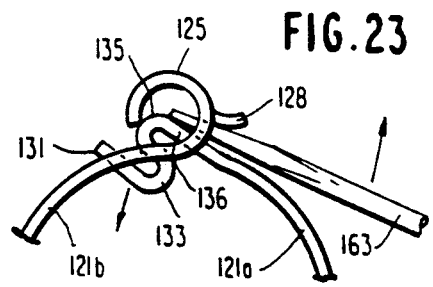
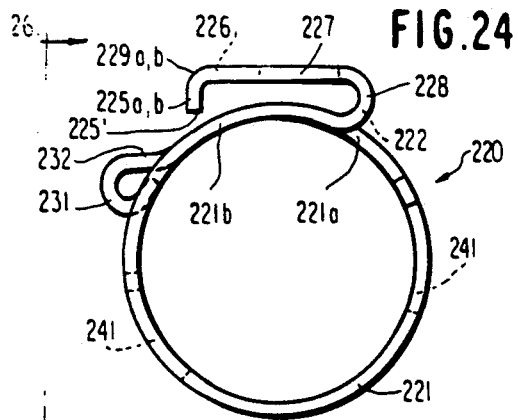
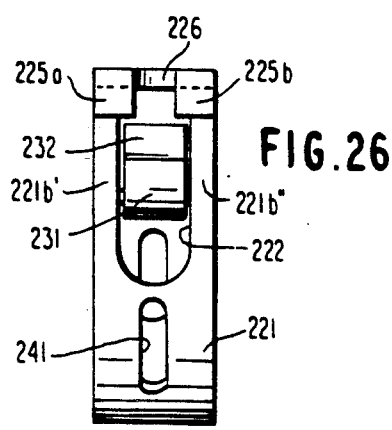
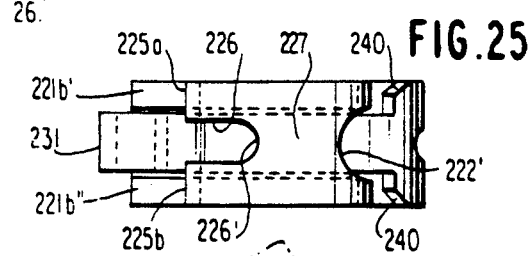
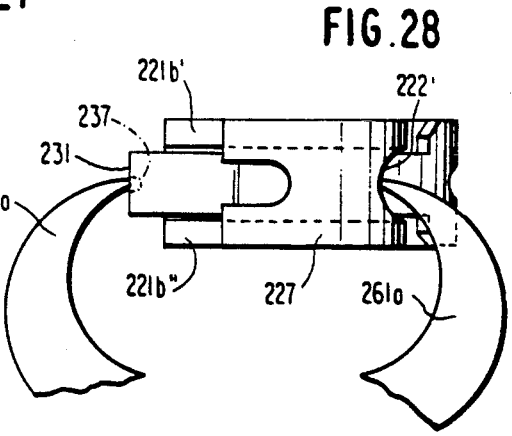
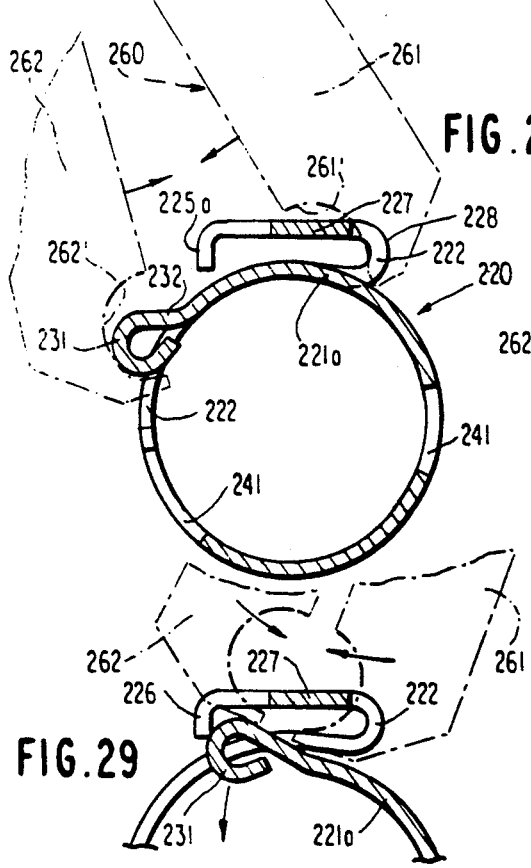
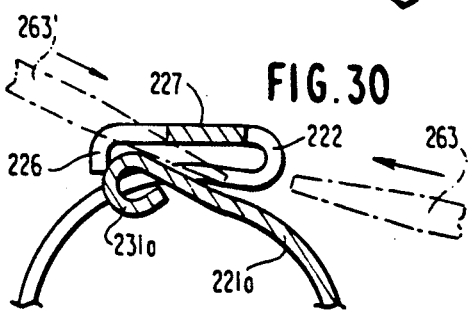

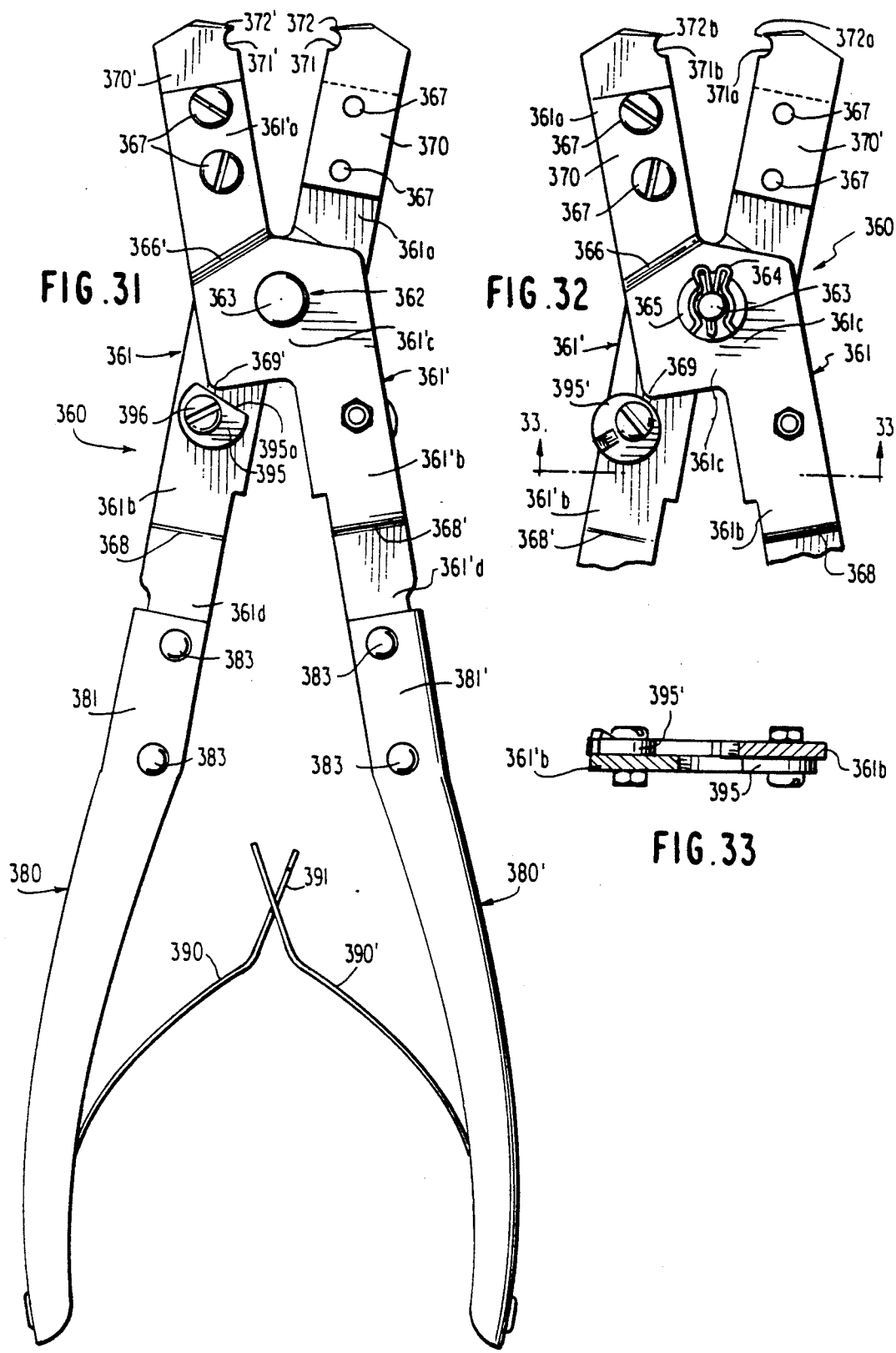

SELF-TIGHTENING CLAMP

The present invention relates to a self-tightening clamp made from spring steel band material which produces a clamping force as a result of its inherent springiness.

BACKGROUND OF THE INVENTION

Self-tightening clamps made from spring wire or spring steel band material are known as such in the prior art. Such types of clamps are commercially available, for example, as "Mubea" clamps. As known, such self-tightening clamps produce the clamping force by the inherent elasticity causing the clamps to assume a reduced diametric dimension. To install these types of clamps, they have to be opened against the inherent spring force present in the band material. To that end, the prior art self-tightening clamps are provided with outwardly projecting distal ends or tabs for engagement by a suitable tool. However, such tool-engaging tabs which project radially outwardly a substantial distance, represent an ever-present source of injury, for example, in assembly work within the area of the engine compartment or at other, not easily accessible places, such as the fuel tank, fuel lines, fuel vent lines, CV joints, etc., not to mention the fact that in many applications, such as in the automotive industry, projecting parts in such clamps are undesirable in many cases for lack of adequate space.

Self-tightening clamps, which can be held in the open position for delivery to the customer are also known in the prior art. For example, European patent application 0 303 505 describes several embodiments in which either a separate holder is placed over the radially outwardly distal ends of projecting tabs (FIGS. 19 and 20 of the EP 0 303 505 A1) or a radially outwardly directed tab, formed at one distal end of the clamping band has to be displaced in front of a support piece to temporarily lock the clamp in the open or expanded position.

The German Patent DE 36 33 486 C1 as also the German patent DE 38 32 875 C1 describe other constructions of self-tightening clamps in which radially outwardly directed tabs can be temporarily locked in the open clamp position.

The prior art self-tightening clamps of the type described hereinabove all entail certain drawbacks. They all involve tab members extending relatively far radially outwardly, which is undesirable if not unacceptable for injury and/or space reasons pointed out hereinabove. Additionally, many of these prior art clamps require special tools to open and/or release the temporarily locked clamp after installation over the hose to be tigthened. This, in turn, jeopardizes their use in markets other than the OEM market, such as in the after-market. Furthermore, there exists always the danger that such prior art clamps are installed incorrectly, absent the use of the special tools, which may lead to product liability claims that involve substantial costs to establish the absence of liability of the manufacturer for the incorrectly mounted clamps. Additionally, these prior art clamps entail the disadvantage that they do not assure an internal clamping surface devoid of any steps or gaps which is important to minimize leakages within the area of gaps or steps.

SUMMARY OF THE INVENTION

The present invention eliminates the aforementioned shortcomings and drawbacks encountered in the prior art by extraordinarily simple means in a self-tightening clamp which can be readily manufactured and permits ease of handling both for opening and installing the clamp.

The underlying problems are solved in one embodiment according to the present invention in that the outer band end portion of the overlapping band portions is provided with a bridging portion while the inner band end portion is provided with a tongue-like part adapted to pass underneath the bridging portion. The inner band end portion is also provided with a detent member which preferably has an external surface slanting down in a direction opposite the free end of the inner band portion so as to facilitate sliding movement underneath the bridging portion during opening of the clamp. The bridging portion may be provided with an aperture complementary in shape to the detent member so as to provide a locking action when the detent member snaps into the aperture during opening of the clamp as a result of its inherent springiness. The distal ends of the inner and outer band portions ma be bent up slightly to provide tool-engaging surfaces. Furthermore, a substantially stepless, gap-free internal clamping surface is assured by the tongue-like part passing underneath the bridging portion.

In another embodiment according to the present invention, the tool-engaging surface in the outer band portion is formed by the edges at the distal end of the bridging portion while the tool-engaging surface of the inner band portion is formed by a slightly raised distal end of the inner band end portion extending in the circumferential direction. The tongue-like inner band end portion can thereby extend through a longitudinal slot in the outer band portion of such width as to permit the tongue-like inner band end portion to extend therethrough.

The detent member may be of circular, part-circular, rectangular, oval shape or other appropriate shape realized by cold deformation after suitable cuts are made to permit pressing out the detent member. The detent member may also be in the shape of a cold-deformed hook-like member as disclosed in my prior U.S. Pat. No. 4,299,012.

The bridging portion which is defined by lateral leg portions joined by a connecting portion has thereby preferably a depth such that the inner surface of the tongue-like inner ban end portion is flush with the inner clamping surfaces of the outer band end portion in the band parts laterally remaining on both sides of th bridging portion.

According to another feature of the present invention and in order to further reduce any injury danger, the free ends of the outer band end portion as also the free end of the inner band end portion may be bent back upon themselves with small radii of curvature so that the tool-engaging surfaces are then formed by the transversely extending bent-back surfaces.

The bent-back end portions may thereby be bent back either in the outward direction and/or in the inward direction. The bent-back outer band end portion may be provided with generally inwardly extending end sections, so spaced from the outer band portion surface as to provide a locking action when the detent member passes underneath the end sections of the bentback outer band portion. The bent-back outer band end portion is thereby elastically lifted outwardly and will, as a result of the inherent spring characteristics of the clamping band, spring back inwardly once the detent section has passed underneath the same, thereby providing the locking action. In the alternative, the detent member in the inner band end portion may also be formed by an undulated band section with the rounded-off outwardly protruding transition section constituting the detent surface.

According to the present invention, a special tool may also be provided for opening and releasing the different types of self-tightening clamps which is simple in construction, easy to manufacture and assemble and reliable in use.

Accordingly, it is an object of the present invention to provide a self-tightening clamp made from band spring steel which avoids the aforementioned shortcomings and drawbacks encountered in the prior art.

Another object of the present invention resides in a self-tightening clamp of the type described hereinabove which avoids parts extending outwardly a relatively large distance and assures at the same time an internal clamping surface substantially devoid of any steps or gaps.

Still another object of the present invention resides in a self-tightening clamp of the type described above which minimizes any injury danger by the absence of any sharp projecting edges.

A further object of the present invention resides in a self-tightening clamp which can be manufactured in a simple, cost-efficient manner, can be opened by the use of a simple conventional tool, and can be released from the temporarily locked open position by mere finger pressure or by use of an appropriate conventional tool.

Still another object of the present invention resides in a self-tightening clamp which offers ease of handling for purposes of installing the same over a hose to be tigthened thereby on a nipple or connecting pipe stub.

BRIEF DESCRIPTION OF THE DRAWINGS

These and other objects, features and advantages of the present invention will become more apparent from the following description when taken in connection with the accompanying drawing which shows, for purposes of illustration only, two embodiments in accordance with the present invention, and wherein:

FIG. 1 is an axial elevational view, partly in cross section and at right angle to the clamp axis of a self-tightening clamp in accordance with the present invention in the installed condition of the clamp;

FIG. 2 is an axial elevational view of the clamp of FIG. 1 in the open position;

FIG. 3 is a top plan view on the clamp of FIG. 1 illustrating the same in the clamping position;

FIG. 4 top plan view on the clamp of FIG. 2, illustrating the same in the open, temporarily locked position;

FIG. 5 is a cross-sectional view, taken along line 5—5 of FIG. 1;

FIG. 6 is a cross-sectional view, taken along line 6—6 of FIG. 1;

FIG. 7 is a cross-sectional view, taken along line 7—7 of FIG. 1;

FIG. 8 is a cross-sectional view, taken along line 8—8 of FIG. 1;

FIG. 9 is a partial cross-sectional view taken through the longitudinal center of the clamp of FIG. 1 and illustrating the parts thereof in the clamping position;

FIG. 10 is a partial cross-sectional view, similar to FIG. 9, and illustrating the parts of the clamp in the open position as shown in FIG. 2;

FIG. 17 is an axial elevational view of a further modified embodiment of a clamp in accordance with the present invention showing the parts thereof in the closed clamping position;

FIG. 18 an axial elevational view of the clamp of FIG. 17 illustrating the parts thereof in the open position;

FIG. 19 is a top plan view on the clamp of FIG. 17 in its clamping position and illustrating how the clamp can be opened by the use of a conventional pincer-like tool;

FIG. 20 is a partial elevational view of the clamp of FIG. 17 in its clamping position and illustrating how the clamp can also be opened by the use of conventional flat-nose pliers;

FIG. 21 is a partial elevational view of the clamp of FIG. 17 in its open position and illustrating how the clamp can be opened by the use of conventional pipe pliers;

FIG. 22 is a partial elevational view of the clamp of FIG. 17 in its clamping position, similar to FIGS. 20 and 21 and illustrating how the clamp can also be opened by the use of special tools;

FIG. 23 is a partial elevational view of the clamp of FIG. 18 in its open position and illustrating how the clamp can be released into its clamping position by the use of a conventional screwdriver;

FIG. 24 is an axial elevational view of a still further modified embodiment of a clamp in accordance with the present invention showing the parts thereof in the closed clamping position;

FIG. 25 is a top plan view on the clamp of FIG. 24, showing the parts thereof in the closed clamping position;

FIG. 26 is a side elevational view of the clamp of FIG. 24, taken along line 26—26 of FIG. 24;

FIG. 27 is a cross-sectional view taken through the longitudinal center of the clamp of FIG. 24, showing the parts thereof in the clamping position and illustrating how the clamp can be opened by the use of a special tool;

FIG. 28 is a top plan view on the clamp of FIG. 24, similar to FIG. 25 and illustrating how the clamp of FIG. 24 can be opened by the use of a conventional pincer-like tool;

FIG. 29 is a partial cross-sectional view through the clamp of FIG. 24, similar to FIG. 27, but showing the parts thereof in the open position and illustrating how the open clamp can be released into the clamping position by the use of the special tool;

FIG. 30 is a partial cross-sectional view, similar to FIG. 29, showing the parts of the clamp of FIG. 24 in the open position and illustrating how the open clamp can be released into the closed clamping position by the use of a conventional screwdriver;

FIG. 31 is an elevational view of a special tool for use with the self-tightening clamp structures, in particular of FIGS. 17-30;

FIG. 32 is a partial elevational view of the back side of the special tool of FIG. 31; and FIG. 33 is a cross-sectional view of the special tool of FIGS. 31 and 32, taken along line 33—33 of FIG. 32..

DETAILED DESCRIPTION OF THE DRAWINGS

Figure 11:
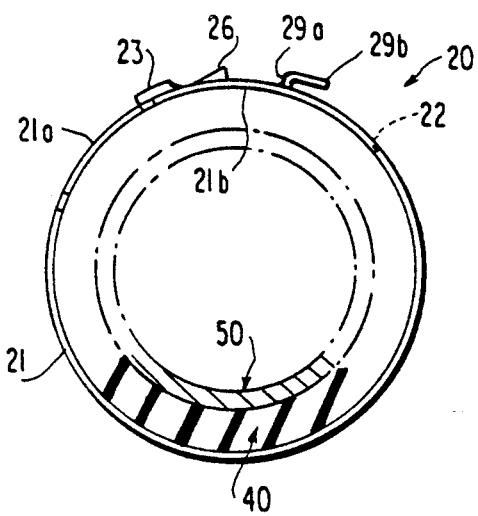
FIG. 11 is an elevational view, partly in cross section, through a modified embodiment of a clamp in accordance with the present invention, illustrating the parts thereof in the closed clamping position.
Figure 12:
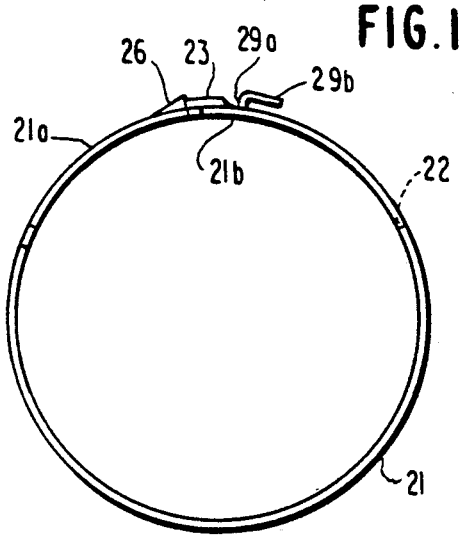
FIG. 12 is an axial elevational view of the clamp shown in FIG. 11 illustrating the parts of the clamp in the open position.
Figure 13:
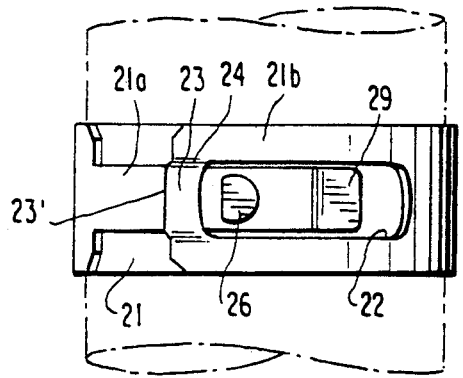
FIG. 13 is a top plan view on the clamp of FIG. 11 showing the parts thereof in the closed clamping position.
Figure 14:
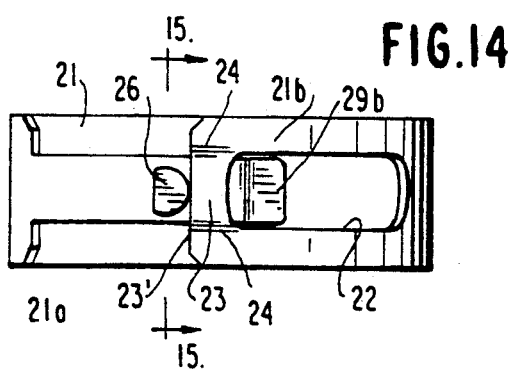
FIG. 14 is a top plan view on the clamp of FIG. 12, showing the parts thereof in the open position.
Figure 15:
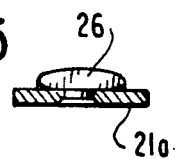
FIG. 15 is a cross-sectional view, taken along line 15—15 of FIG. 14.

Referring now to the drawing, wherein like reference numerals are used throughout the various views to designate like parts, and more particularly to FIGS. 1 through 10, the clamp generally designated by reference numeral 20 is made from appropriate spring steel band material and includes a clamping band 21 having overlapping inner and outer band end portions 21a and 21b, respectively. The outer band end portion 21b is provided with an elongated opening 22 of such width as to permit the inner end portion 21a of tongue-like configuration to extend therethrough. The outer band end portion 21b includes a bridging portion 23 of approximately U-shaped cross section whose height is determined by the lateral leg portions 24 (FIG. 6) joined by the top surface of the bridging portion. The depth of the bridging portion 23 is thereby preferably such that the inner clamping surface of the tongue-like inner band end portion 21a is flush with the remaining lateral band sections 21b' (FIG. 7) remaining laterally on both sides of the leg portions 24 in the outer band end portion 21b. In practice, this means that the depth of the bridging portion corresponds substantially to the thickness of the band material which, with band material as used for such self-tightening clamps, results in an almost negligible outward projection. As can be seen in particular in FIGS. 1 and 9, the interaction of the tongue-like inner band portion 21a with the remaining lateral band sections 21b' assures an internal clamping surface devoid of any step or discontinuity as the inner and outer band portions 21a and 21b can be caused to merge in such a manner as to produce a truly circular internal clamping surface capable of adapting itself to dimensional tolerances in the hose diameter. Appropriate heat treatment in a conventional manner of the clamping band will permanently set the necessary configurations into the clamping band to achieve these results.

The bridging portion 23 is provided with an aperture 25 for engagement by a detent member 26 formed in the inner band end portion 21a. The detent member 26 illustrated in the embodiment of FIGS. 1—10 is of part circular shape and is formed by pressing out the inner band end material after a cut along the front part of the detent member 26. However, it is understood that the particular shape and configuration of the detent member 26 may also differ, for example, may be of rectangular, triangular, oval or full circular configuration or may be a hook-like member as described in connection with the support hooks in my prior U.S. Pat. No. 4,299,012.

In each case, the aperture 25 will have to be adapted to the particular configuration of the detent member 26. As can also be seen in FIG. 7, the outer surface of the detent member 26 slopes downwardly toward the inner band end portion in a direction opposite to the free end of the inner band portion 21a so as to facilitate the detent member 26 to slide underneath the bridging portion 23. With the application of opening forces by conventional pliers or pincer-like tools at the tool-engaging surfaces of the inner and outer band end portions, the detent member 26 will slide underneath the bridging portion 23 and, in the course thereof, may even lift slightly the outer band end portion 21b which is possible due to its springiness.

In the illustrated embodiment, the tool-engaging surface at the outer band end portion is formed by an obliquely outwardly extending end section 27 which projects only a small distance radially outwardly due to the acute angle between this end section 27 and the circumferential direction of the clamping band. The tool-engaging surface 28 of the inner band end portion 21a is formed by a generally radially bent-up end section 28 which again projects only slightly out of the normal circumference of the clamp. While the tool-engaging surfaces 27 and 28 could be made to extend across the full width of the outer and inner band end portions, they only extend over a part, approximately one-half the width of the band end portions, the other parts being formed by circumferentially extending end sections 30 and 29, respectively, to facilitate the application of radially inwardly or outwardly directed forces, for example, to assist in the release, respectively, detent engagement of the clamp. The end section 29 thereby consists of a generally radially outwardly extending section 29a adjoined by a short straight section 29b extending generally in the circumferential direction. The outermost ends of the inner and outer band portions 21a and 21b at the end sections 27 and 28 are thereby spaced in the radially outward direction only a small distance from the outer contour of the clamp, for example, at most about five times the thickness of the clamping band and as little as about 3-5 times the thickness of the clamping band.

The clamp which normally assumes its clamping position of reduced diametric dimension (FIGS. 1 and 9) can be shipped to the customer in a temporarily locked open position shown in FIGS. 2 and 10 in which it is then mounted over the hose generally designated by reference numeral 40 which has previously been mounted over a nipple or pipe stub generally designated by reference numeral 50. The thus-installed clamp can then be released into its clamping position by merely applying pressure on the circumferentially extending tab portion 29. Depending on the particular material of the clamping band and its thickness, finger pressure may be adequate. However, if necessary, a screwdriver or similar tool can also be used for that purpose.

FIGS. 11-15 illustrate a modified embodiment of a self-tightening clamp in accordance with the present invention in which similar reference numerals are again used to designate similar parts. The embodiment of FIGS. 11-15 differs from the embodiment of FIGS. 1-10 in that the aperture 25 as also the tool-engaging end part 27 of the embodiment of FIGS. 1-10 are omitted and are constituted by the edge surfaces 23' of the distal end of the bridging portion 23. Additionally, the distal end of the inner band end portion includes a tool-engaging surface formed by the outwardly extending band part 29a and by the circumferentially extending band part 29b which now extend As to the rest, the embodiment of FIGS. 11-15 is similar in structure and operation to the embodiment of FIGS. 1-10 and what was said with respect to the embodiment of FIGS. 1-10 therefore equally applies to the embodiment of FIGS. 11-15. The tool for opening the clamp may be a conventional pincer-like tool to be used as described in connection with FIG. 19 or conventional pliers or also a special plier-like tool in which the jaws engaging with the end surface 23' are provided with a central opening to permit the passage therethrough of detent member 26 which ma also be of reduced width.

Figure 16:
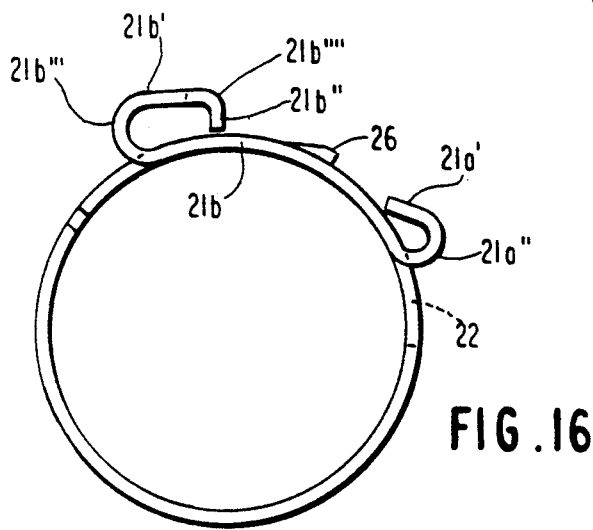
FIG. 16 is an axial elevational view of still another modified embodiment of a clamp in accordance with the present invention showing the parts thereof in the closed clamping position.

The embodiment of FIG. 16 differs from the embodiment of FIGS. 11-15 in that the outer band end portion 21b, instead of forming the bridging portion 23 of FIGS. 1-10, is outwardly bent back upon itself by way of rounded-off transition section 21b''' to form a bridging section 21b' bent back upon itself through 180° and extending generally in the circumferential direction which is adjoined by way of another rounded-off transition section 21b'''' by a radially inwardly extending locking section 21b'' terminating externally of the outer surface of the underlying band end portion 21b by a distance less than the maximum height of the detent member 26. Upon opening the clamp by a conventional tool, the detent member 26 will slide underneath the inwardly extending section 21b'' while elastically lifting the same so that once having passed the same, the detent member 26 will lock the clamp in the open position by engaging with the spring-like inwardly extending locking section 21b''. The tool-engaging surfaces are thereby formed by the transition section 21b''' in the outer band portion 21b and by the rounded-off transition section 21a'' of the bent-back free end of the inner band portion 21a'. The embodiment of FIG. 16 offers still greater safety against injury by the bent-back configuration including sections 21b''' and 21b'' and 21a'' and 21a'. An internal clamping surface devoid of any step or discontinuity is again assured by the interaction of the tongue-like inner band portion 21a with the slot-like opening 22 in the outer band portion 21b and the shape thereof permitting the inner and outer band portions to merge into a shape providing a truly circular internal clamping surface.

While the embodiments of FIGS. 1-16 are primarily intended for clamps made from thinner spring band materials providing relatively lower clamping forces, FIGS. 17-30 disclose more heavy-duty self-tightening clamps made from stronger spring band material and providing relatively higher clamping forces.

The self-tightening clamp generally designated by reference numeral 120 of the embodiment of FIGS. 17-22 includes a clamping band 121 made from steel band material with predetermined spring characteristics. The inner band end portion 121a is in the form of a tongue-like extension adapted to pass through the elongated slot 122 provided in the outer band portion 121b. Starting from the free end of the outer band portion 121b, the latter consists of a circular free end section 125 which forms again a bridge-like structure and which is provided with circular holes 126 and 127. The circular end section 125 thereby extends over about 270°. A hook-like tool-engaging member 128 is bent out from the end of the slot-like opening 122 nearer the free end of the outer band portion 121b and is preferably provided with a small, approximately triangularly shaped notch-like recess 129 for engagement by the pointed end of jaw 161 of the pincer-like tool generally designated by reference numeral 160 (FIG. 19).

Starting from the free end of the tongue-like inner band portion 121a, an obliquely inwardly extending end section 131 is provided with an approximately triangularly shaped notch-like recess 132 for engagement by the pointed end of the other jaw 162 of the pincer-like tool 160 (FIG. 19). The obliquely extending end section 131 is adjoined by a round ⓡd-off transition section 133 so that the next-following outwardly extending connecting section 134 extends at least approximately parallel to the inwardly extending tool-engaging section 131. Following the connecting section 134 is another rounded-off transition section 135 that is adjoined by an obliquely inwardly extending camming section 136 which passes over into the circumferentially extending tongue-like inner band end portion 121a. The obliquely outwardly extending section 136 thereby acts as a camming surface when the clamp is opened so as to elastically lift the end section 125 outwardly to permit a detent-like locking action when the inner end 125' of the end section 125 snaps-in elastically behind the transition section 135 forming in effect a detent member as shown in FIG. 18.

As can best be seen in FIG. 19, the tongue-like inner band portion 121a passes over into the full band width by way of tapered surfaces 140. Slot-like openings 141 are additionally provided in the clamping band 121 to impart a desired flexibility to the clamp when opening the same against its inherent spring forces.

In operation, the self-tightening clamp 120 in its clamping position (FIGS. 17 and 20) also assures an internal clamping surface devoid of any step or discontinuity by the interaction of the parts 121a, 121b and slot 122 and their particular configuration as explained by reference to the embodiments of FIGS. 1-16.

The self-tightening clamp of FIG. 17 can be opened by the use of a conventional pincer-like tool generally designated by reference numeral 160 as shown in FIG. 19 to displace the same into the open, non-clamping position illustrated in FIG. 18. The same can be achieved by the use of conventional flatnose pliers whose jaws 161a and 162a (FIG. 20) engage with the tool-engaging surfaces formed by the bent-out hook-like member 128 and the outwardly extending section 131.

FIG. 21 illustrates the self-tightening clamp of FIG. 17 in the open non-clamping position of FIG. 18 by the use of conventional pipe pliers whose jaws 161b and 162b again engage with the part-circular end section 125 and the outwardly extending end section 131.

FIG. 22 shows how the clamp of FIG. 17 can be opened by the use of a special tool 160 having jaws 161c and 162c as will be described in detail more fully hereinafter. FIG. 22 illustrates that the availability of the special tool usable with the embodiment of FIGS. 24-30 may also be appropriate with the clamp of FIGS. 17 and 18.

FIG. 23 illustrates how the locked open clamp illustrated in FIG. 18 can be released into its self-tightening clamping position shown in FIG. 17 by the use of a conventional screwdriver 163. For that purpose, the screwdriver 163 is inserted into the slot-like opening 122 underneath the hook-like tool-engaging member 128 in such a manner that its opposite surface engages with the obliquely outwardly extending section 136. By rotating the screwdriver 163, the tongue-like sections 136, 135 are pressed downwardly so that the clamp is released when the transition portion 135 assumes a position radially inward of the end surface of the end section 125 whereupon the inherent spring characteristic will cause the clamp to reduce its diametric dimension and assume its self-tightening clamping position of FIG. 17.

As can be readily seen from FIG. 17, the transition section 135 thereby extends radially outwardly a greater distance than the lowermost surface of the end section 125 so that the latter is elastically forced outwardly by the camming surface 136 as the clamp is opened by the use of a tool.

The self-tightening clamp structure illustrated in FIGS. 24-30 and generally designated by reference numeral 220 again includes a clamping band 221 made of appropriate spring steel with predetermined spring characteristics and thickness to achieve the desired self-tightening characteristics. The clamp 220 which is somewhat similar to the embodiment of FIG. 16, includes overlapping inner and outer band end portions 221a and 221b. The outer band end portion 221b is again provided with a slot-like opening 222, the length of which is best illustrated in FIG. 27. Starting from the free end of the outer band portion 221b, inwardly extending end sections 225a and 225b are provided which are separated by a slot-like opening 226 extending into the generally rectilinear connecting section 227 which adjoins the end sections 225a and 225b by way of roundedoff transition sections 229a and 229b. The rectilinear connecting section 227 is adjoined by another rounded-off, convexly shaped transition section 228 which passes over into the outer band end portion provided with the slot 222 leaving on both sides thereof the lateral outer band end portions 221b' and 221b" (FIG. 26). Whereas the transition sections 229a and 229b essentially provide a right angle relationship between the end sections 225a, 225b and the connecting section 227, the transition section 228 extends over an angle greater than 180° as shown in FIG. 24. The sections 225a, 225b, 227 and 228 thus form again a bridge-like structure.

Starting with the free end of the tongue-like inner band portion 221a, a part-circular end section 231 is provided which is adjoined by an obliquely inwardly extending camming section 232 that passes over into the tongue-like inner band end portion 221a. The rounded-off end section 231 thereby subtends an angle greater than 180°, for example, 270° to provide the configuration as shown in FIGS. 24, 27 and 30. The tongue-like inner band end portion 221a passes over into the full band width by way of the tapered sections 240 (FIG. 25). Additionally, the clamping band 221 is again provided with slot-like openings 241 to impart the desired flexibility to permit opening of the self-tightening clamp.

In operation, the self-tightening clamp 220 in its clamping position (FIGS. 24-27) again assures an internal clamping surface devoid of any step or discontinuity by the interaction of the parts 221a, 221b and slot 222 and their particular configuration as explained above. The clamp can be opened from its clamping position by the use of either special pliers having jaws 261 and 262 (FIG. 27) or by the use of conventional pincer-like tools (FIG. 28) whose jaws 261a and 262a engage respectively with the rounded-off end surface 222' of the slot-like opening 222 and the tool-engaging abutment surface formed by the rounded-off end section 231. The end surfaces 225' of the inwardly extending end sections 225a and 225b are thereby spaced from the outer surface of the lateral outer band portions 221b' and 221b" by a distance smaller than the radial height of the end section 231 of the inner band end portion 221a so that opening of the clamp will cause the locking end sections 225a and 225b to be elastically forced outwardly by the camming surface 232 to permit the end section 231 forming a detent member to pass underneath the locking end sections 225a and 225b until the end sections 225a and 225b can again springily lock behind the end section 231, thereby locking the clamp in the open condition. To facilitate the application of the pointed end of the jaw member 262a of the pincer-like tool (FIG. 28), the end section 231 may again be provided with a notch-like indentation 237 shown in dash-and-dotted lines in FIG. 28. The special tool generally designated by reference numeral 260, which will be described more fully hereinafter, is shown in FIG. 27 as including a first jaw member 261 having a thickness less than the width of the slot-like opening 222 so that its end section provided with a rounded-off recess 261' is able to engage with the end surface 222' of the elongated slot 222 (FIG. 25). The semi-circularly shaped recess 262' of the other jaw 262 is thereby able to engage with the circularly shaped end section 23 whereby the jaw members 261 and 262 are of appropriate construction to permit closing of the jaw members 261 and 262 in the directions indicated by the arrows.

The same special tool 260 can also be used to release the clamp from the open position into the clamping position as shown in FIG. 29. The jaw members 262 and 261 are thereby so applied that the jaw member 262 extends into the slot-like opening 226 and the jaw member 261 extends into opening 222 as shown in FIG. 29 so that upon closing of the jaw members 261 and 262 in the direction of arrows (FIG. 29), the jaw member 262 seeks to press inwardly the end section 231 to release the locked open clamp. The other jaw member 261 will thereby seek to lift the outer band portion and more particularly its end sections 228, 227 and 225a, 225b to facilitate release.

However, the special tool 260 is not required to release the locked open clamp of FIG. 29 as this can also be done by the use of a conventional screwdriver as shown in FIG. 30 in which the screwdriver 263 can be inserted through the slot-like opening 222 from the right as shown in FIG. 30 to depress the end section 231 or the screwdriver 263' can be inserted through the slot-like opening 226 from the left as viewed in FIG. 30 to press down the end section 231 in order to release the clamp into the clamping position. The tongue-like end section 231 can thereby be depressed by merely rotating the screwdriver 263 or 263'. Moreover, the screwdriver can also be inserted axially between the connecting section 227 and the end section 231 so that release of the clamp into the clamping position is effected when the screwdriver is rotated, thereby depressing the tongue-like end section 231.

The special tool generally designated by reference numeral 360 and illustrated in FIGS. 31-33 shows a special tool which may be used with the self-tightening clamps 120 of FIGS. 17-23 and the self-tightening clamps 220 of FIGS. 24-30 where such tool was only partially shown and designated by reference numeral 160 (FIG. 22) and by reference numeral 260 (FIGS. 27 and 29). This special tool 360 Which utilizes a principle of construction found in pliers or pincer-like tools, includes two mutually crossing main members generally designated by reference numerals 361 and 361', each including oppositely directed leg portions 361a, 361b and 361'a, 361'b of substantially the same width interconnected by a wider connecting portion 361c and 361'c extending at least approximately at right angle to the respective leg portions 361a, 361b and 361'a, 361'b. The main members are pivotally interconnected in the area of their connecting portions 361c and 361'c at 362 in any conventional manner, for example, by a pivot bolt 363 held in place by a cotter pin 364 with the interposition of a washer 365. The specially shaped tool extensions 370 and 370', properly speaking, are secured to the leg portions 361a and 361'a of the main members 361 and 361' by screws 367 or the like. As can be seen from FIGS. 31 and 32, the extensions 370 and 370' are of the same width as the leg portions 361a and 361'a to which they are secured on mutually facing sides. In order for the tool extensions 370 and 370' to be in the same plane in which they rotate during pivotal movement of the tool, an appropriate offset 366 and 366' is provided at the transition between respective upper leg portion 361a, 361'a and connecting portion 361c, 361'c. The lower leg portions 361b and 361'b terminate in rectilinear shank portions 361d and 361'd which are connected with the rectilinear upper end portions 381 and 381' of handle members generally designated by reference numerals 380 and 380' by rivets 383. To permit the handle members 380 and 380' to pivot in the same plane, further offsets 368 and 368' are provided between lower leg portions 361b and 361'b and shank portions 361d and 361'd. Whereas the main members 361 and 361' as also the tool extensions 370 and 370' are punched-out from flat steel plate materials of appropriate thickness, the handle members 380 and 380' have an essentially U-shaped cross section with the legs of the U spaced from each other by a distance slightly greater than the thickness of the shank portions 361d and 361'd so as to securely receive the latter in the space formed thereby. The remainder of the handle members 380 and 380' may be shaped in any appropriate manner, preferably slightly convexly as shown in the drawing. To hold the special tool normally open mutually interengaging spring members 390 and 390' may be provided with the end of spring member 390' extending through a slot 391 in spring member 390. To limit the maximum opening of the special tool, a part-circular stop member 395 having a rectilinear stop surface 395a (FIG. 31) is eccentrically as well as adjustably secured by screw 396 or the like on the inside of leg portion 361b in such a manner that the rounded-off corner 369' of the connecting portion 361'c will abut at surface 395a in predetermined maximum open position of the tool. A disk-like stop member 395' (FIG. 32) is eccentrically mounted on the inside of the leg portion 361'b and serves to be able to hold or lock the tool in any predetermined position including open or closed position when the rounded-off corner 369' of the connecting portion 361c abuts at the disk-like member 395b.

The tool extensions 370 and 370' are each provided at their mutually facing end surfaces with part-circular cutouts 371 and 371' as well as with nose portions 372 and 372' of a shape and dimension to optimize engaging with the tool-engaging surfaces provided in the self-tightening clamps for opening the same and possibly also for closing the open clamps. The nose portions 372 and 372' may thereby have the shape shown in greater detail in FIG. 22 or in FIGS. 27 and 29.

The special tool in accordance with the present invention offers a number of significant advantages. The main members 361 and 361' as well as the tool extensions 370 and 370' may be made by simple punching operations whereby different materials and different thickness may be used for the starting materials thereof. For example, the extensions 370 and 370' may be made from high-grade tool steel while the main members 361 and 361' may be made from a lower-grade, less costly steel material. The various parts of the special tool may be assembled in an extraordinarily simple manner whereby the interchangeability of the tool extensions 370 and 370' permit the use of standardized parts for the main members 361, 361' and the handle members 380 and 380' to obtain modified special tools for different applications. Additionally, the special tool of the invention can be readily limited to a maximum opening position which greatly increases the convenience of its use when, for instance, opening clamp 220 or 120. Furthermore, because of the particular shape of the various parts and their assembly, only three different parts consisting of identical main members 361, 361' of identical tool extensions 370 and 370' and of identical handle members 380, 380' are required which can be readily standardized.

While I have shown and described several embodiments in accordance with the present invention, it is understood that the same is not limited thereto. For example, the distal end of the tongue-like inner band end portion 21a may also be formed by an obliquely outwardly extending part extending only a short distance beyond the outer surface of the outer band end portion 21b. The desirability to minimize outwardly projecting parts may be further enhanced thereby. Moreover, the free ends of the bent back upon themselves as described in connection with FIG. 16 whereby the bent-back end sections then preferably extend over the full width of the respective band portion. Additionally, the tool extensions 370a and 370b may be shaped both have a different shape and which need not be identical. Thus, the present invention is susceptible of numerous changes and modifications as known to those skilled in the art, and I therefore do not wish to be limited to the details shown and described herein but intend to cover all such changes and modifications as are encompassed by the scope of the appended claims.

I claim:

1. A self-tightening clamp operable to assume a reduced diametric dimension as a result of its inherent springiness and adapted to be expanded in its diametric dimension to enable installation over a hose, comprising clamping band means made from spring steel and normally defining a substantially circular configuration, said clamping band means having overlapping end portions, one clamping band end portion having a tongue-like configuration of a width less than the width of clamping band means, the other clamping band end portion being provided with an elongated slot of such width as to permit the tongue-like inner band end portion to extend through same, detent means in said one band end portion, said detent means being located to be within the area of said slot when the clamp is in its reduced diametric dimension corresponding to its self-clamping position, said outer band portion being provided with locking means to lock the clamp in its expanded diametric dimension corresponding to the open clamp position by engagement with said detent means, and further means to minimize the danger of injury by the free ends of any inner and outer band end portions which are so constructed that the free end of any inner and outer band portion extends at most only a limited distance in a direction radially outwardly from the outer surface of the clamping band means.

2. A self-tightening clamp according to claim 1, which comprises still further means to assure an internal clamping surface in the clamp substantially devoid of any steps or discontinuities.

3. A self-tightening clamp according to claim 2, wherein said still further means includes an outwardly extending bridging portion in the outer band end portion thereof, the width of the outwardly extending bridging portion being slightly larger than the width of said tongue-like portion and the height thereof being such that the inner clamping surface of the tongue-like inner band end portion is substantially flush with the remaining lateral parts of the outer band end portion and merges with the outer band end portion to produce an internal clamping surface devoid of any step or discontinuity.

4. A self-tightening clamp according to claim 3, wherein said tool-engaging means at the outer band end portion is formed by the edge surface of the distal end of the bridging portion itself.

5. A self-tightening clamp according to claim 1, wherein said first-mentioned further means are formed by inner and outer band portions whose free ends protrude only a slight distance beyond the circumferential contours of the clamp.

6. A self-tightening clamp according to claim 5, wherein at least one of said free ends of the inner and outer band portions extend obliquely outwardly with respect to the circumferential direction of the clamp.

7. A self-tightening clamp according to claim 6, wherein the outermost end of the inner band end portion is spaced from the outer contour of the clamp in the radially outward direction by a distance at most equal to about five times the thickness of the clamping means.

8. A self-tightening clamp according to claim 5, wherein the outermost end of the inner band end portion is spaced from the outer contour of the clamp in the radially outward direction by a distance at most equal to about five times the thickness of the clamping band means.

9. A self-tightening clamp according to claim 1, wherein said further means are effectively formed by curvilinear ends of at least one of the inner and outer band end portions.

10. A self-tightening clamp according to claim 9, wherein the further means are effectively formed by curvilinear ends of both the inner and outer band end portions.

11. A self-tightening clamp according to claim 10, wherein the free ends of both the inner and outer band end portions are bent back upon themselves.

12. A self-tightening clamp according to claim 9, wherein at least the free end of the outer band end portion is bent back upon itself.

13. A self-tightening clamp according to claim 1, wherein the distal ends of the inner and outer band end portions include tool-engaging means to enable the application of a tool for expanding the clamp into its open position.

14. A self-tightening clamp according to claim 13, wherein the tool-engaging means are formed by outwardly bent distal ends in the clamping band end portions.

15. A self-tightening clamp according to claim 13, wherein the tool-engaging means at the inner band end portion is formed by an outwardly bent end extending obliquely outwardly only a small distance.

16. A self-tightening clamp according to claim 1, wherein the detent means has an external surface which decreases in height in a direction away from the distal end of the inner band portion.

17. A self-tightening clamp according to claim 16, wherein the distal ends of the inner and outer band end portions include tool-engaging means to enable the application of a tool for expanding the clamp.

18. A self-tightening clamp according to claim 17, wherein said still further means includes an outwardly extending bridging portion in the center area of the outer band end portion, the width of the outwardly extending bridging portion being slightly larger than the width of said tongue-like portion and the height thereof being such that the inner clamping surface of the tongue-like inner band end portion is substantially flush with the remaining lateral parts of the outer band end portion and merges with the outer band end portion to produce an internal clamping surface devoid of any step or discontinuity.

19. A self-tightening clamp according to claim 18, wherein the tool-engaging means at the inner band end portion is formed by an outwardly bent end extending obliquely outwardly only a small distance.

20. A self-tightening clamp according to claim 19, wherein the tool-engaging means at the outer band end portion is formed by the edge surfaces of the distal end of the bridging portion itself.

21. A self-tightening clamp according to claim 18, wherein said locking means includes an aperture provided in the bridging portion.

22. A self-tightening clamp according to claim 18, wherein said locking means is formed by the edge surface at the distal end of the bridging portion.

23. A self-tightening clamp according to claim 1, wherein the outer band end portion is externally bent back upon itself and terminates in a generally inwardly directed end section forming the locking means for the detect means.

24. A self-tightening clamp according to claim 23, wherein the detent means is a punched-out part in the inner band end portion.

25. A self-tightening clamp according to claim 23, wherein the detent means is a curvilinear section in the inner band end portion.

26. A self-tightening clamp according to claim 25, wherein the detent means is also bent back upon itself.

27. A self-tightening clamp according to claim 1, wherein the detent means is in the form of a loop-like inwardly bent inner band end portion forming a first tool-engaging surface means by the loop surface, and wherein the locking means is in the form of an outwardly extending bent-back outer band end portion having an inwardly extending locking end section.

28. A self-tightening clamp according to claim 27, wherein the outwardly extending bent-back outer band end portion of the locking means includes, starting from the free end thereof, two generally inwardly extending end section separated by a slot-like opening, said inwardly extending end sections passing over into an at least approximately rectilinear connecting section which in turn passes over into the outer band end portion by way of a convexly shaped transition section.

29. A self-tightening clamp according to claim 28, wherein the loop-like inwardly bent inner band end portion forming the detent means includes, starting from the free end thereof, a part-circular end section adjoined by an obliquely inwardly extending camming section that passes over into the tongue-like inner band portion, the maximum spacing between the end surfaces of the inwardly extending locking end sections and the underlying outer band portion being smaller than the maximum radial height of the loop-like inner band end section forming the detent means.

30. A self-tightening clamp according to claim 29, wherein the licking end sections pass over into the connecting section by way of a rounded-off transition section, and wherein said slot-like opening extends through the last-mentioned transition section into a part of the connecting section.

31. A self-tightening clamp according to claim 30, wherein said elongated slot extends into the convexly shaped transition section, and wherein the end of said elongated slot within the area of the locking means forms a second tool-engaging surface means.

32. A self-tightening clamp according to claim 31, wherein said convexly shaped transition section and said partcircular end section subtend an angle greater than 180°.

33. A self-tightening clamp according to claim 32, which comprises still further means to assure an internal clamping surface in the clamp substantially devoid of any steps or discontinuities.

34. A self-tightening clamp according to claim 1, wherein the outer band end portion terminates in a curvilinear bent-back end section forming the locking means, and wherein the tongue-like inner band portion terminates in a radially undulated end section forming the detent means.

35. A self-tightening clamp according to claim 34, wherein the inner band portion, starting from the free end thereof, includes an obliquely inwardly extending section adjoined by a rounded-off transition section which passes over into an obliquely outwardly extending connecting section that passes over by way of another rounded-off transition section into an obliquely inwardly extending camming section that, in turn, then passes over into the circumferentially extending tongue-like inner band portion.

36. A self-tightening clamp according to claim 35, wherein the outer band portion forming the locking means includes, starting from the free end thereof, a circular end section extending over about 270°, the elongated slot extending into a part of the circular end section, and a hook-like outwardly extending tool-engaging member formed at the end of the elongated slot within the area of the circular end section.

37. A self-tightening clamp according to claim 36, wherein said second-mentioned rounded-off transition section extends outwardly a radial distance greater than the spacing between the free end surface of the circular end section and the underlying outer band portion.

38. A self-tightening clamp according to claim 37, which comprises still further means to assure an internal clamping surface in the clamp substantially devoid of any steps or discontinuities.

39. A self-tightening clamp operable to assume a reduced diametric dimension as a result of its inherent springiness and adapted to be expanded in its diametric dimension to enable installation over a hose, comprising clamping band means made form spring steel and normally defining a substantially circular configuration, said clamping band means having overlapping end portions, one clamping band end portion having a tongue-like configuration of a width less than the width of the clamping band means, the other clamping band end portion being provided with an elongated slot of such width as to permit the tongue-like inner band end portion to extend through same, detent means in said one band end portion, said detent means being located to be within the area of said slot when the clamp is in its reduced diametric dimension corresponding to its clamping position, said outer band portion being provided with locking means to lock the clamp in its expanded diametric dimension corresponding to the open clamp position by engagement with said detent means, and further means to minimize the danger of injury within the area of the free ends of the inner and outer band end portions, said locking means including an outwardly extending bridging portion in the outer band end portion whose internal width is slightly larger than the width of said tongue-like inner band end portion and whose internal height is such that during expansion of the clamp the detent means is able to slide underneath the bridging portion until operable to engage with said locking means as a result of the latter's inherent springiness.

40. A self-tightening clamp according to claim 39, wherein said detent means is operable to lockingly engage with said locking means as a result of the inherent springiness of the clamping band means.

41. A self-tightening clamp according to claim 39, wherein said locking means includes an aperture provided in the bridging portion.

42. A self-tightening clamp according to claim 39, wherein said locking means is formed by the edge surface at the distal end of the bridging portion.

43. A self-tightening clamp according to claim 39, wherein the detent means has an external surface which decreases in height in a direction away from the distal end of the inner band portion.

44. A self-tightening clamp according to claim 43, wherein said detent means is a cold-deformed hook-like detent member pressed-out of the inner band end portion.

45. A self-tightening clamp according to claim 44, wherein said detent member is of at least partcircular shape.

46. A self-tightening clamp according to claim 45, wherein said detent member of at least part-circular shape is punched out only on the side facing the distal end of the inner band end portion.

47. A self-tightening clamp according to claim 44, wherein said detent member has an engaging surface for engagement with said locking means which is defined by a substantially transverse cut in the inner band end portion while being integral with the inner band end portion over substantially the remainder of its configuration.

48. A self-tightening clamp according to claim 44, wherein said detent member is one of circular, part-circular, oval or rectangular shape as viewed in plan view.

49. A self-tightening clamp according to claim 39, wherein said bridging portion is defined by two lateral leg portions interconnected by a connecting portion, and wherein the internal depth of the bridging portion corresponds substantially to the thickness of the clamping band means.

* * * * *